United States Patent

[11] 3,534,731

[72] Inventor Jean-Nicolas Muller
 43, rue du 22-Novembre, Strasbourg, France
[21] Appl. No. 705,118
[22] Filed Feb. 13, 1968
[45] Patented Oct. 20, 1970
[32] Priority Aug. 18, 1967, Oct. 23, 1967
[33] France
[31] 8,962 and 9,007

[54] MEANS FOR JOINING PARTS OF FRACTURED BONES
 4 Claims, 11 Drawing Figs.
[52] U.S. Cl. ........................................................ 128/92
[51] Int. Cl. ...................................................... A61f 5/04
[50] Field of Search ........................................... 128/92, 83

[56] References Cited
FOREIGN PATENTS
118,577  1958  U.S.S.R. ....................... 128/92

OTHER REFERENCES
Journal of Bone and Joint Surgery Vol. 48 – B Nov. 1966, pp X. XI Primary Examiner—L. W. Trapp
Assistant Examiner—J. Yasko
Attorney— Ernest G. Montague ABSTRACT: An apparatus for joining parts of fractured bones, comprising a bone-knitting plate and fixing key for use in combination therewith, for the uniting of a bone fracture, noteworthy in that it is constituted by a plate for application to the two seats of fracture of the bone, on one of which it is fixed by at least two screws and on the other of which it is fixed by one screw passing through an elongated aperture in the plate; the key being composed of two tubular elements sliding freely one within the other, one being fast with an eccentric collar which effects the joining of the two seats of fracture by rotation of the eccentric collar upon and in a flat provided on the plate, and comprising the elongated aperture, and the other provided with a hexagon for effecting the fixing of the screws.

Patented Oct. 20, 1970
3,534,731
Sheet 1 of 3
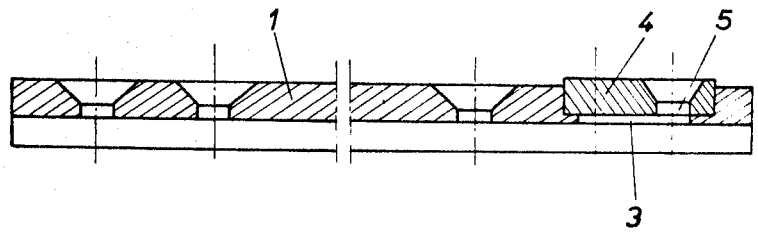
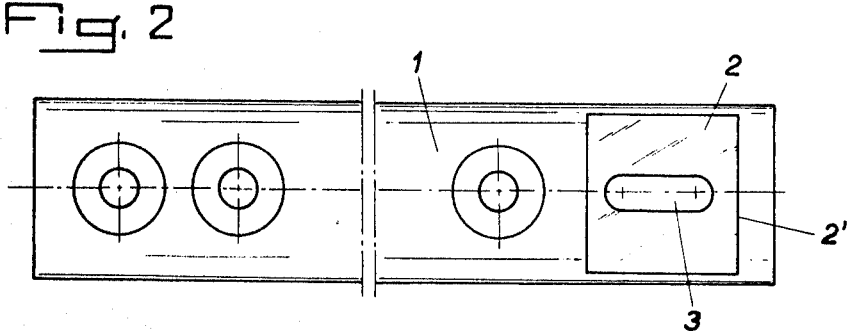
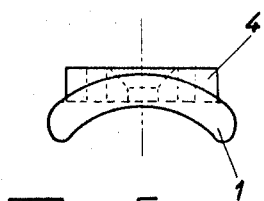
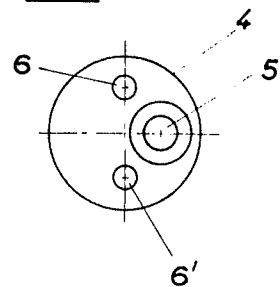
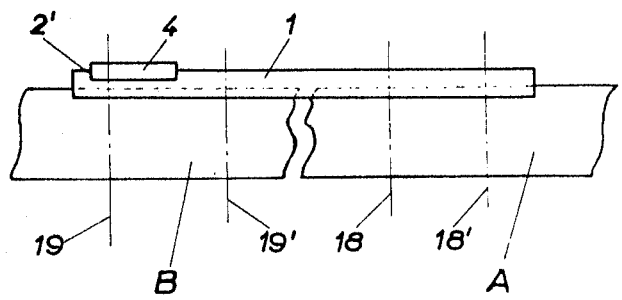

MEANS FOR JOINING PARTS OF FRACTURED BONES

The present invention relates to bone-knitting plates for fractures. It is an object of the present invention to provide an improved bone-knitting plate and a screw-fixing key for use in combination therewith, for the uniting of a bone fracture.

The uniting of bone fragments is generally effected at present by means of bone-knitting plates comprising either a lateral screw or a removable stretcher apparatus. This then has the disadvantage of necessitating a supplementary screw for the actual fixing of this element, and a larger incision.

It is therefore one object of the invention to provide a bone-knitting apparatus which avoids or mitigates the above mentioned disadvantage.

It is another object of the present invention to provide a bone-knitting plate and a screw-fixing key for use in combination therewith for the uniting of a bone fracture, comprising a plate for placing upon the two seats of fracture of the bone, which plate possesses a flat recess in which an elongated aperture is provided for the passage of a screw engaged either in an eccentric hole of a disc placed on the flat and securing the assembly of plate and eccentric upon one of the seats of the fracture, or in a bore in an eccentric collar of a tubular tightening key bearing upon the edge of the said flat to ensure the reunion of the two seats of fracture of the bone, with the purpose of effecting the union on the plate itself in line with the seat of fracture.

The tubular screw-fixing key for fixing the plate, which in combination with the bone-knitting plate forms the object of the invention, comprises two tubular elements sliding one within the other. One of these elements is formed by a hollow rod which has in its lower part an eccentric collar comprising two small lugs intended to lodge in the holes provided in the eccentric collar or, these lugs being omitted, resting directly upon the flat of the plate to ensure union in vertical alignment, by its own rotation about its own axis. The other is formed by a solid rod terminating in a hexagonal part for effecting the tightening of the screw introduced into the hole in the collar to effect the union, of a second screw possibly to complete the fixing of this seat of fracture, and of the two fixing screws of the plate on the second seat of fracture.

With these and other objects in view which will become apparent in the following detailed description, the present invention will be clearly understood in connection with the accompanying drawings, in which:

FIG. 1 is a sectional view on an enlarged scale of the plate and the disc constituting the eccentric of the present invention;

FIG. 2 is a plan view of the plate alone;

FIG. 3 is a view of the plate and the eccentric disc seen from the left;

FIG. 4 is a plan view of the eccentric disc;

FIG. 5 is a side elevational view of the bone-knitting plate fixed upon the fractured bone;

Figure 6:
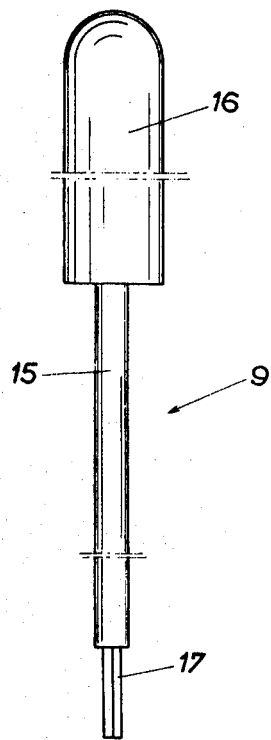
FIGS. 6 and 6a show respectively an elevational view and a view from beneath of the part of the key sliding in the tubular part and equipped with a hexagon for the screwing of fixing screws having hexagonal sockets.

Referring now to the drawings, and more particularly to FIGS. 1, 3, 4, 5, 7 and 7a the bone-knitting plate according to the invention comprises a plate which is slightly curved inwardly transversely (FIG. 3) in order to adapt itself to the two seats of fracture of the bone and in which holes are provided (FIG. 1) in variable number according to its size for its securing by screws, in the present example, two such screws for each of the two parts of the fractured bone.

On this plate 1 a flat (recess) 2 is provided in which a slot 3 is cut in the form of an elongated aperture.

A disc 4, pierced eccentrically with a hole 5 permitting the passage of a fixing screw and comprising two small holes 6, 6', is placed upon and into the flat 2. The diametrically opposite holes 6, 6' are provided to receive two small lugs 14, 14' of the collar of a special key combined with the plate to permit the rotation of the disc forming the eccentric about the axis of the hole 5.

Figure 7:
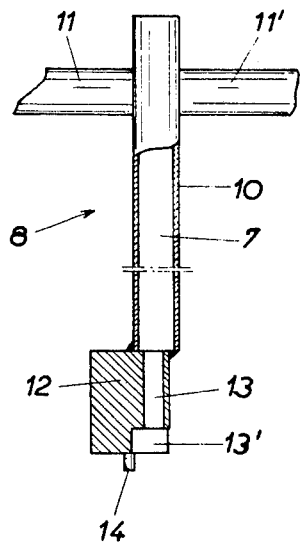
FIG. 7 is a fragmentary elevational view partly in section of the tubular external part of the special key, effecting the rotation of the eccentric.
Figure 6A:
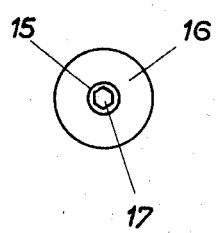
Figure 7A:
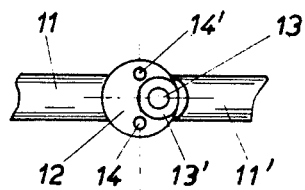
FIG. 7a is a fragmentary view from beneath thereof showing the arrangement of the drive lugs.

This special key, which also effects the tightening of the fixing screws of the plate on the two seats of fracture of the bone comprises two parts 8 and 9 engaged one within the other (FIGS. 6 to 7a). The part 8 is formed by a hollow rod 10 comprising two rod stubs 11, 11' in the upper part permitting holding and rotation of the disc. To its base there is eccentrically welded a piece 12 pierced with a bore 13 in extension of the opening 7 in the hollow rod 10, but of a slightly smaller diameter, and comprising the above-mentioned two small lugs 14, 14' which are intended to lodge in the holes 6 and 6'. The bore 13 is shaped in its lower part 13' to permit the introduction of the heads of the fixing screws.

The part 9 of the key comprises a rod 15 terminating at its upper part with a piece 16 serving for the holding and turning and at its lower part with a part 17 of hexagonal form intended to penetrate into the hexagonal socket of the screw in order to effect the tightening of the latter.

For the utilization of the key, the rod 15 is introduced into the bore 7 of the rod 10 until it abuts against the upper edge of the bore 13 in the piece 12 in such manner that the hexagon part 17 is flush with the lower base of the piece 12, without protruding.

Referring now to FIG. 5, the fixing of the plate according to the invention is effected in the following manner:

The plate 1 is fixed on one of the seats of fracture A by screws 18, 18', then the screw 19, which passes through the disc 4 and the aperture 3 of the plate, is fixed in the seat B of fracture of the bone, but without tightening.

The two lugs 14 and 14' of the key are introduced into the holes 6 and 6' of the disc 4, which thus is caused to rotate about its axis and which, by virtue of its eccentricity, bears upon the rear edge 2' of the flat 2 of the plate and therefore in this way shifts the latter with the part A of the bone in the direction of the arrow F towards the end of the bone part B, this movement being rendered possible by the aperture 3 provided in the flat of the plate.

As soon as the joining of the two parts A and B of the bone is effected, the screw 19 is tightened fully with the aid of the part 9 of the key, the part 8 being arrested, in which this part 9 rotates freely. Then the second fixing screw 19' is positioned and tightened in the same part B of the bone.

The union thus effected can be measured by the provision of reference marks on the eccentric collar and on the plate.

Figure 8:
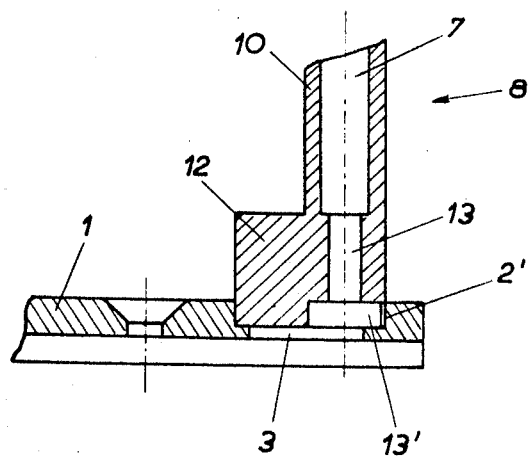
FIG. 8 is a fragmentary sectional view of the plate and a part of the tubular key.
Figure 9:
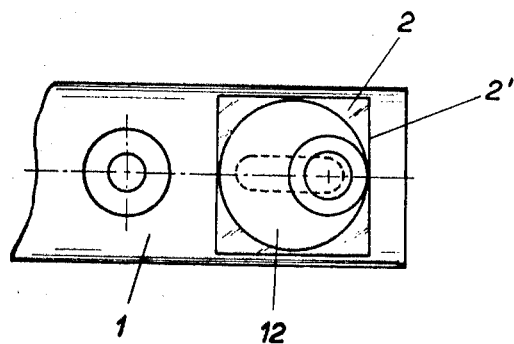
FIG. 9 is a fragmentary view thereof from above.

According to the second embodiment as represented in FIGS. 8 and 9, the disc 4 and the two lugs 14, 14' of the special key of FIGS. 1—7 have been omitted, and the part 8 of the key serves directly, with its eccentric piece 12 having a diameter slightly smaller than the width of the flat, for shifting one of the bone parts towards the end of the other bone part.

In fact after the fixing of the screw 19 in the seat of fracture of the bone, through the slot 3 without tightening, the piece 12 of the part 8 of the key is placed into the flat 2 and this part 8 is rotated about its axis. By virtue of its eccentricity this part 8 bears upon the edge 2' of the flat of the plate and therefore displaces the latter, uniting the two seats of fracture of the bone.

I claim:

1. A bone-knitting plate and a fixing key for use in combination therewith for effecting the uniting of a fracture in alignment with the seat of fracture, comprising:

a plate slightly transversely curved for positioning upon two seats of fracture of a bone;

at least two first screws fixing said plate on one of said two seats of fracture;

said plate formed with a flat adapted to be positioned adjacent the other of said two seats of fracture, said flat including a longitudinally elongated aperture and a surface facing towards said one of said two seats of fracture;

a disc positioned in said flat and having two holes therein and an eccentric hole;

at least two second screws adapted to fix said plate to said other of said two seats of fracture, one of said second screws being positioned, through said eccentric hole and said elongated aperture;

a fixing key having a terminal collar including two lugs, the latter being complementarily detachably connected to said disc in said two holes thereof, to permit the placing in contact of the two seats of fracture of the bone by rotation of said disc, driven by said two lugs of said fixing key, so that said disc bears upon said facing surface of said flat;

said fixing key comprises two tubular elements sliding freely one within the other, the first being formed of a hollow rod comprising a cylindrical collar at its lower part having an eccentric bore of smaller diameter at its end, and equipped with said two lugs adapted to lodge in said two holes in the disc to effect the junction of the two seats of fracture of the bone by rotation of said disc about its eccentric axis, and the second tubular element being formed of a solid rod having a hexagonal piece at its end adapted to turningly engage said screws and for rotation about its axis, after free engagement in said first tubular element, in order to effect the fixing of the screws first on a free part of said plate and then of the screw engaged on the part of the place having said flat, after the two seats of the bone have been brought together.

2. A bone-knitting plate and a fixing key for use in combination therewith for effecting the uniting of a fracture in alignment with the seat of fracture, comprising:

a plate slightly transversely curved for positioning upon two seats of fracture of a bone;

at least two first screws fixing said plate on one of said two seats of fracture;

said plate formed with a flat adapted to be positioned adjacent the other of said two seats of fracture, said flat including a longitudinally elongated aperture and a surface facing towards said one of said two seats of fracture;

at least two second screws adapted to fix said plate to said other of said two seats of fracture, one of said second screws being positioned through said elongated aperture;

a tubular fixing key having a terminal eccentric collar, to permit the placing in contact of the two seats of fracture of the bone by rotation of said eccentric collar, driven by said fixing key, so that said eccentric collar bears upon said facing surface of said flat;

said eccentric collar of said tubular fixing key releasably positioned directly upon said flat of the plate and thus permits on rotation of said key and bearing upon said facing surface of the flat displacing said plate so as to unite the two seats of fracture of the bone.

3. An apparatus for surgically joining parts of fractured bones, comprising:

an artificial bone-knitting plate and a fixing key for use in combination therewith, for the uniting of a bone fracture;

said plate being formed with a flat having an elongated aperture and being for application to two seats of fracture of a bone;

at least two first screws fixing said plate on one of said two seats of fracture;

one second screw passing through said elongated aperture in the plate;

said fixing key comprising:

two tubular elements sliding freely one within the other, an eccentric collar fixed to one of said tubular elements and said collar effecting the joining of said two seats of fracture by rotation of the said eccentric collar rotatably positioned upon and in said flat on said plate, and comprising said elongated aperture; and a hexagon part on said other tubular element cooperatively for effecting the fixing of said screws.

4. A bone-knitting apparatus for effecting the uniting of a bone fracture, comprising:

a plate slightly curved in cross section for positioning upon two adjacent seats of a fracture of a bone;

first screw means for securing one portion of said plate to one of said seats of fracture;

the portion of said plate adjacent the other of said seats of fracture formed with a flat having an elongated aperture extending in the direction of joining the fracture bone and the flat defining an abutment surface facing the fracture;

a pivot screw passing through said aperture into said other of said seats of fracture;

an eccentric cam means having an eccentric opening through which said pivot screw detachably passes and being adapted to be fixed to said other of said seats of fracture defining a pivot axis, said cam means adapted to pivot thereabout upon application of a turning force causing said cam means to press against said abutment surface causing said one of said seats of fracture to be pulled against said other of said seats of fracture, said elongated aperture moving relative to said pivot screw; and second screw means for securing said other of said seats of fracture to said plate after said two seats of fracture have been pulled together.